United States Patent
Liao et al.

(10) Patent No.: US 8,465,718 B2
(45) Date of Patent: Jun. 18, 2013

(54) SUPERHYDROPHOBIC AND SELF-CLEANING POWDERS HAVING MICRON-SCALE DIAMETER AND NANO-SCALE SURFACE ROUGHNESS AND FABRICATION METHOD THEREOF

(75) Inventors: Shih-Chieh Liao, Taoyuan (TW); Hsiu-Fen Lin, Taichung (TW); Jin-Ming Chen, Taoyuan (TW)

(73) Assignee: Industrial Technology Research Institute, Hsinchu (TW)

(*) Notice: Subject to any disclaimer, the term of this patent is extended or adjusted under 35 U.S.C. 154(b) by 1053 days.

(21) Appl. No.: 11/868,444

(22) Filed: Oct. 5, 2007

(65) Prior Publication Data

US 2009/0025508 A1     Jan. 29, 2009

(30) Foreign Application Priority Data

Jul. 26, 2007  (TW) .................... 96127292 A

(51) Int. Cl.
*C09D 7/00* (2006.01)
(52) U.S. Cl.
USPC ........ 423/335; 423/594.9; 423/610; 423/625; 423/622; 423/274; 106/14.39
(58) Field of Classification Search
USPC .............. 423/622, 274, 335, 594.9, 610, 625; 977/811; 106/14.39
See application file for complete search history.

(56) References Cited

U.S. PATENT DOCUMENTS

| | | | |
|---|---|---|---|
| 5,693,236 A | 12/1997 | Okumura et al. | |
| 6,156,409 A * | 12/2000 | Doushita et al. | 428/143 |
| 6,683,126 B2 * | 1/2004 | Keller et al. | 524/492 |
| 2006/0147705 A1 * | 7/2006 | Huang et al. | 428/345 |
| 2006/0204528 A1 * | 9/2006 | Nolte et al. | 424/401 |
| 2007/0134469 A1 | 6/2007 | Liao et al. | |
| 2008/0199659 A1 * | 8/2008 | Zhao | 428/161 |
| 2009/0011222 A1 * | 1/2009 | Xiu et al. | 428/323 |

FOREIGN PATENT DOCUMENTS

| | | | |
|---|---|---|---|
| CA | 2576670 A1 | | 3/2006 |
| DE | 102005006870 | | 8/2006 |
| EP | 0704769 | * | 4/1996 |
| JP | 2003-066462 | | 3/2003 |
| TW | 335461 | | 7/1998 |
| TW | 200500429 | | 1/2005 |
| WO | 2004/104116 | * | 12/2004 |
| WO | 2006/023065 | * | 3/2006 |

OTHER PUBLICATIONS

Kang et al., "High Volume Spray Aerosol Generator Producing Small Droplets for Low Pressure Applications" J. Aerosol Science, vol. 26, No. 7, pp. 1131-1138, 1995, no month.*
Translation of Taiwan Patent Office Action, May 24, 2011.*
Translation of Japan 2003-066462, Mar. 5, 2003, pp. 2,13,21-22,32,36.*

(Continued)

*Primary Examiner* — Steven Bos

(57) ABSTRACT

The invention discloses nano/micron binary structured powders for superhydrophobic, self-cleaning applications. The powders are featured by micron-scale diameter and nano-scale surface roughness. In one embodiment, the average diameter is about 1-25 μm, and the average roughness $R_a$ is about 3-100 nm. The nano/micron binary structured powders may be made of silica, metal oxide, or combinations thereof.

28 Claims, 9 Drawing Sheets

OTHER PUBLICATIONS

Ferry Iskandar et al. "Control of the morphology of nanostructured particles prepared by the spray drying of a nanoparticle sol", Journal of Colloid and Interface Science, 2003, pp. 296-303, Elsevier Inc., US.

Jinsoo Km et al. "Nanoparticle Packaging", Advanced Engineering Materials, 2002, 4, No. 7, pp. 494-496, US.

Kikuo Okuyama et al. "Preparation of nanoparticles via spray route", Chemical Engineering Science 58, 2003, Elsevier Science Ltd., pp. 537-547, US.

China Patent Office, Office Action, Patent Application Serial No. 200710148804.6, Dec. 29, 2010, China.

Japan Patent Office, Office Action, Patent Application Serial No. 2008-56281, Jan. 11, 2011, Japan.

Taiwan Patent Office, Office Action, Patent Application Serial No. 96127292, May 24, 2011, Taiwan.

German Patent Office, Office Action, Application Serial No. 102007050835.4, Mar. 20, 2012, Germany.

* cited by examiner

SUPERHYDROPHOBIC AND SELF-CLEANING POWDERS HAVING MICRON-SCALE DIAMETER AND NANO-SCALE SURFACE ROUGHNESS AND FABRICATION METHOD THEREOF

BACKGROUND OF THE INVENTION

1. Field of the Invention

The invention relates to nano-structured powders, and in particular to powders with superhydrophobic and self-cleaning functions and a fabrication method thereof.

2. Description of the Related Art

Superhydrophobicity is exhibited by the unique microstructure and chemical properties of the leaves of certain plants in nature. The characteristic of a superhydrophobic surface is that water forms spherical droplets immediately when dropping on the surface. Such a superhydrophobic surface possesses a so-called "self-cleaning" function. For example, droplets formed on a lotus leaf carry dust away after rolling off the leaf. This superhydrophobic phenomenon is caused by the roughness and low surface tension of the surface.

When a liquid drops on a surface of an object, an angle is then formed between the surface and the tangent line of the drop, called contact angle θ. When the tension in the gas-solid interface (also called solid surface energy) is high, the contact angle tends to be low, which means the surface easily gets wet. Contact angle of 0 degree indicates that water spreads over and becomes a film on the surface so that the surface would completely get wet. On the contrary, if the tension in the gas-solid interface is low, the contact angle tends to be high, indicating that the surface does not easily get wet. Therefore, contact angle of 180 degrees means that the liquid forms spherical droplets and cannot wet the surface at all.

When the surface of the object is rougher, the contact angle would normally become higher. This is because surface cavities with high aspect ratio may trap air so that the droplet sits on a composite surface made of air and solid.

Presently, there are many methods for preparing a water-repellent surface. For example, U.S. Pat. No. 5,693,236 provides a water-repellent structure and its fabrication method including the steps of: preparing a mixture by mixing a curable liquid with a needle-like material; applying the mixture onto a surface of an object; curing a liquid of the applied mixture and forming an applied layer in which the needle-like material has been mixed on a base material of the cured liquid of the mixture; forming pits and projections of the needle-like material on a surface of the applied layer by etching the applied layer under a condition where an etching rate of the base material is larger than that of the needle-like material; and coating the surface of the applied layer with a water-repellent substance.

The self-cleaning properties are arousing much interest because of their water and dirt repellency. The self-cleaning effect can be applied to building materials such as glass, woods, rocks, or ceramic tiles as well as cars and plastics. Self-cleaning coatings not only save us cleaning and other maintenance costs, but also are good for ecobalance since use of water and cleaning chemicals as well as maintenance frequencies can be greatly reduced or eliminated. Although traditional paints can provide a water-proof coating, droplets formed thereon cannot effectively roll off to carry dust away, thus providing no self-cleaning functions. Therefore, it is desirable to develop a superhydrophobic coating with low surface energy as well as proper surface roughness in order to possess self-cleaning functions.

BRIEF SUMMARY OF THE INVENTION

The invention provides powders with superhydrophobic and self-cleaning functions. The powders are characterized by a spherical shape and a nano/micron binary structure with a micron-scale diameter of about 1-25 μm and a nano-scale surface roughness of about 3-100 nm. The nano/micron binary-structured powders may be made of silica, metal oxide, or combinations thereof.

The invention also provides a method for fabricating superhydrophobic and self-cleaning powders. The fabrication steps comprises: using one or more kinds of nanoparticles and/or sub-micron particles as starting powders, which comprise silicon oxide, metal oxide, or combinations thereof; mixing the starting powders with a solvent to form a slurry; and granulating and calcining the slurry at about 100-2500° C. to form spherical powders characterized by a nano/micron binary structure with a micron-scale diameter and a nano-scale surface roughness, wherein the average diameter and surface roughness of the powders are respectively in the range of about 1-25 μm and 3-100 nm.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention provides nano/micron binary-structured powders, which can be added to paints, car wax, or plastic, or directly coated on a surface of an object to provide self-cleaning functions.

Figure 1:
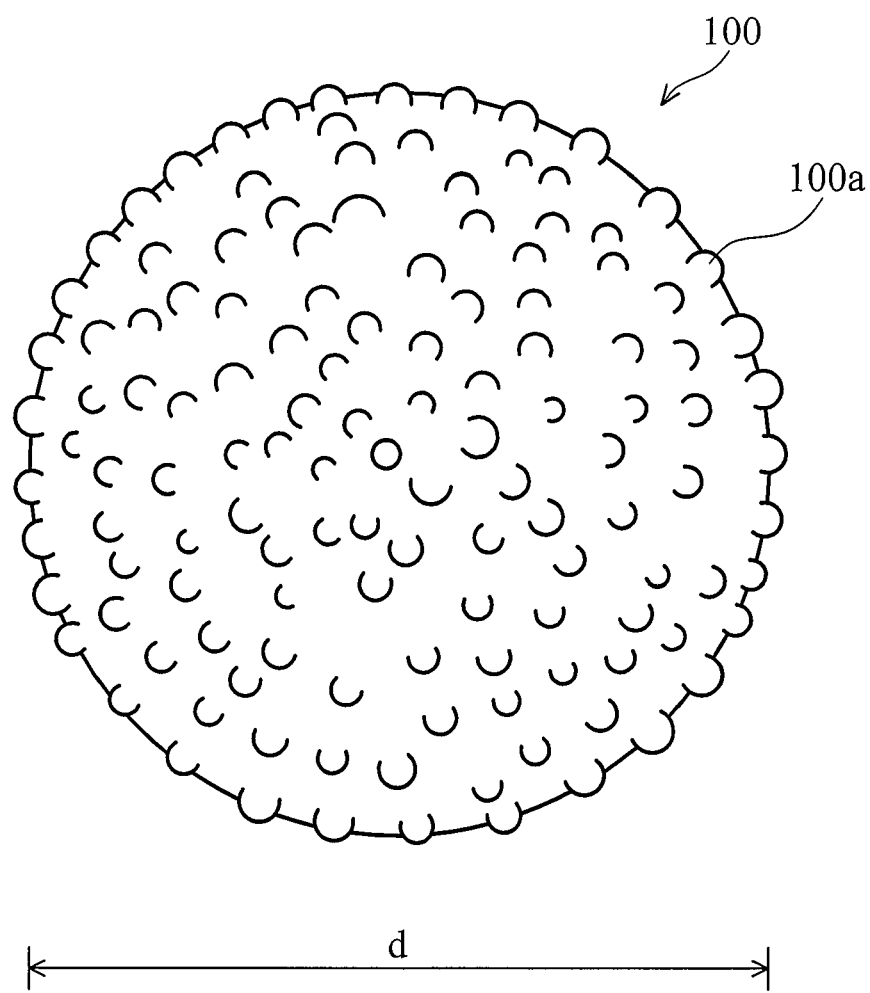
FIG. 1 is a schematic view showing the superhydrophobic and self-cleaning powder according to an embodiment of the invention.

FIG. 1 is a schematic view showing the superhydrophobic and self-cleaning powder according to an embodiment of the invention. As shown in the figure, the self-cleaning powder 100 of the invention is a micron-scale particle provided with nano-scale surface roughness (hereinafter referred to as "nano/micron binary-structured powders" or "self-cleaning powders"). Experimental study shows that the particle size and the surface roughness are both important factors for determining the hydrophobicity of the powders. Generally, a desirable hydrophobicity (water contact angle>120°) can be achieved when the self-cleaning powders 100 have an average diameter d of about 1-25 μm, and when the surface thereof 100a has an average roughness $R_a$ of about 3-100 nm. In one embodiment, the average diameter d is about 5-20 μm and the average roughness $R_a$ is about 5-50 nm.

Figure 2:
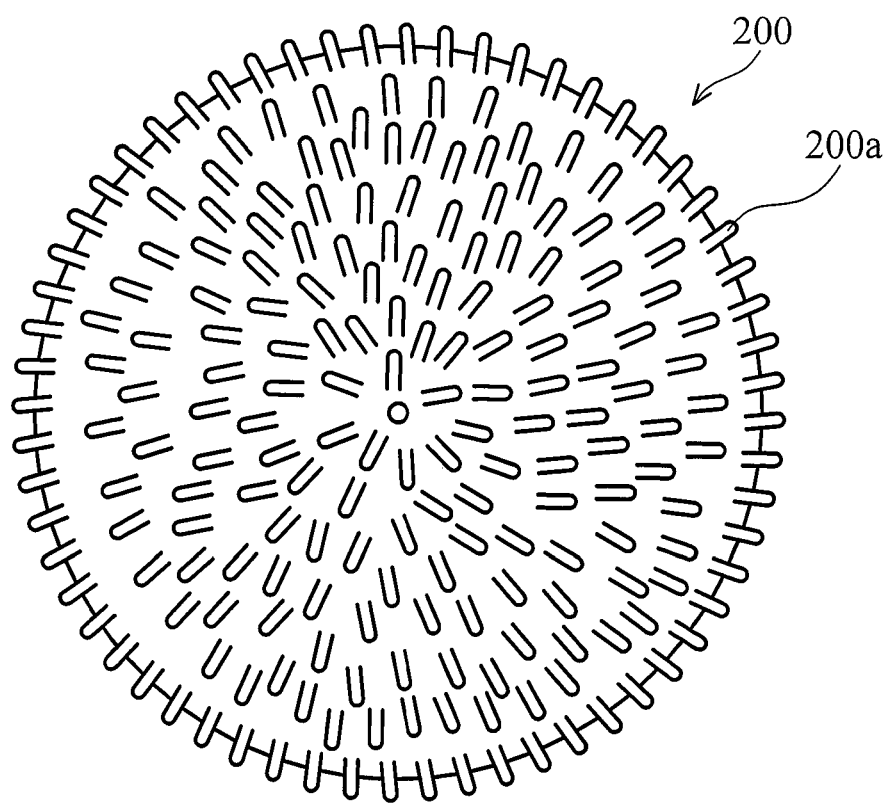
FIG. 2 is a schematic view showing the superhydrophobic and self-cleaning powder according to another embodiment of the invention.

While the self-cleaning powder shown in FIG. 1 has a particulate surface structure, the invention is not so limited. As shown in FIG. 2, the self-cleaning powder 200 may have a needle-like surface structure 200a when fabricated from tetrapod-shaped starting powders. Indeed, as will be appreciated by persons skilled in the art, the improved hydrophobicity and other benefits of the present invention will be realized through other surface morphology as long as the diameter and surface roughness fall within the above identified range. It also should be noted that while the self-cleaning powder shown in FIG. 1 has a perfect spherical shape, it is understood that the powder actually formed may have various bumps or pits on its surface, and a certain degree of distortion may be present.

The self-cleaning powders of the invention may be formed of a single material, or alternatively, formed of two or more different materials. Suitable materials include, but are not limited to, silicon oxide ($SiO_2$), metal oxides such as $TiO_2$, ZnO, $Al_2O_3$, $Zn_2SnO_4$, or combinations thereof. In accordance with the invention, the surfaces of the self-cleaning powders can be modified by a hydrophobic agent to enhance chemical hydrophobicity by reducing the surface energy. Hydrophobic agents conventionally used in the art may be used herein. The frequently used hydrophobic agents include: Si-based hydrophobic agents such as siloxane, silane, or silicone; F-based hydrophobic agents such as fluorosilanes, fluoroalkyl silanes (FAS), polytetrafluoroethylene (PTFE), polytrifluoroethylene, polyvinylfluoride, or functional fluoroalkyl compounds; and hydrocabon hydrophobic agents such as reactive wax, polyethylene, or polypropylene.

The process for fabricating the self-cleaning powder will now be described in detail. In general, the self-cleaning powders of the invention is formed by granulation and calcination of one or more kinds of starting powders at temperatures of about 100-2500° C. The starting powders may include nanoparticles and/or sub-micron particles with an average diameter ranging from about 10 nm to about 500 nm. Suitable materials for the starting powders include, but are not limited to, silicon oxide ($SiO_2$), metal oxides such as $TiO_2$, ZnO, $Al_2O_3$, $Zn_2SnO_4$, or combinations thereof.

In particular, the starting powders may be selected from at least one of the following: (i) nanoparticles formed of the same material; (ii) nanoparticles and sub-micron particles formed of the same material; (iii) nanoparticles formed of different materials; and (iv) nanoparticles and sub-micron particles formed of different materials. Illustrative starting powders for (i) nanoparticles formed of the same material include 10 nm diameter $SiO_2$ particles, or 30-100 nm diameter ZnO or $Zn_2SnO_4$ particles. Illustrative starting powders for (ii) nanoparticles and sub-micron particles formed of the same material include $Al_2O_3$ particles with an average diameter ranging from about 50 nm to about 300 nm. Illustrative starting powders for (iii) nanoparticles formed of different materials include a mixture of 10 nm diameter $SiO_2$ and 30 nm diameter ZnO particles, wherein the weight ratio of $SiO_2$ to ZnO may range from 1:1 to 1:3. Illustrative starting powders for (iv) nanoparticles and sub-micron particles formed of different materials include a mixture of 10 nm diameter $SiO_2$ and 250 nm diameter $TiO_2$ particles with a weight ratio of 1:1 to 1:3 ($SiO_2$:$TiO_2$), or a mixture of 50 nm diameter $Al_2O_3$ and 250 nm diameter $TiO_2$ particles with a weight ratio of 1:1 to 1:3 ($Al_2O_3$:$TiO_2$).

The starting powders used herein may have a spherical shape, a tetrapod shape, or a mixture of the two. Fabrication methods for terapod-shaped powders can be found in commonly assigned U.S. Patent Publication. No. 20070134469, the teachings of which are hereby incorporated by reference. To avoid the photocatalytic effect of ZnO and $TiO_2$, a transparent barrier material such as silicon oxide can be coated on the ZnO or $TiO_2$ powders to form a transparent barrier layer with a thickness of about 2-10 nm so as to form ZnO—$SiO_2$ or $TiO_2$—$SiO_2$ core-shell structures.

In the fabrication process, the starting powders such as $SiO_2$, $TiO_2$, or $Zn_2SnO_4$ are first dispersed in water to form a slurry with a solid content of about 5-40% by weight, during which a dispersing agent may be optionally added. To reduce the surface energy of the powders, a hydrophobic agent may be added to slurry with a weight ratio of about 1:1-1:4 (hydrophobic agent:starting powder). As described earlier, suitable hydrophobic agents include Si-based hydrophobic agents, F-based hydrophobic agents, and hydrocabon hydrophobic agents.

Thereafter, the starting powders in the slurry are granulated and calcined into nano/micron binary-structured powders by spray drying, spray pyrolysis, flame pyrolysis, or plasma spray in a spray pressure of about 1-5 bar. In one embodiment, the granulation and the calcination are performed as two separate steps. For example, the starting powders are granulated by spraying drying at about 100-300° C., followed by calcination at an elevated temperature of about 300-1000° C. In another embodiment, the granulation is performed in conjunction with the calcination, for example, by spray pyrolysis at 500-1000° C., flame pyrolysis at 1000-1500° C., or plasma spray at 1000-2500° C. to form the nano/micron binary-structured powders directly.

After being subjected to calcination at high temperature, the nano and/or submicron-sized starting powders are fused into micron particles. When spherical staring powders are used, the resulting powders exhibit a particulate surface structure as shown in FIG. 1. When tetrapod-shaped starting powders are used, the resulting powders exhibit a needle-like surface structure as shown in FIG. 2.

The self-cleaning powders of the invention may be added into paints, car wax, or plastic, or it may be directly coated onto an object to provide a superhydrophobic and self-cleaning coating having a water contact angle of above 120°. In preferred embodiments, a self-cleaning coating having water contact angle of above 150° can be achieved. Other conventional additives can be present in the self-cleaning coating. Such additives include binders, flame retardants, plasticizers, surfactants, fillers, and so on. These optional additives and appropriate amounts are well known to those of skill in the art and, accordingly, will not be described herein in detail.

Surfaces which can be treated with the self-cleaning particles or coatings include glass, plastics, metals, ceramics, polymers, woods, rocks, but can also include other materials or composites.

Without intending to limit it in any manner, the present invention will be further illustrated by the following examples.

Example 1

Figure 7:
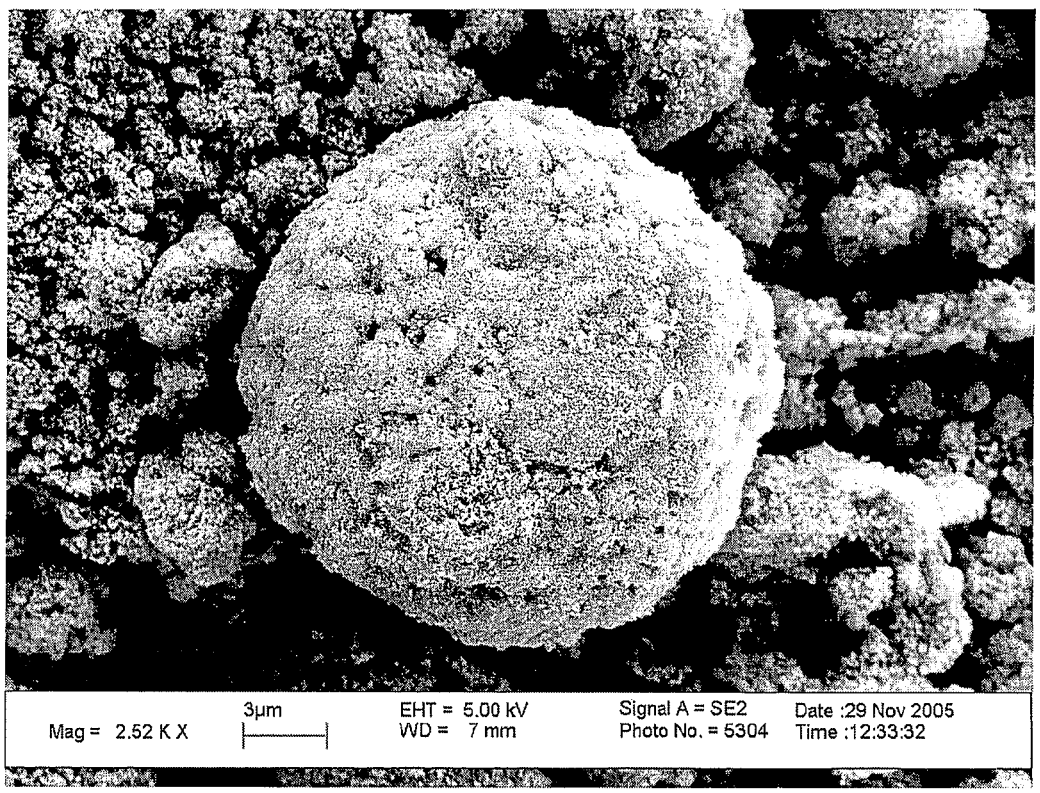
FIG. 7 is a SEM picture of the superhydrophobic and self-cleaning powder formed from $SiO_2$ powders.

8.3 g of 10 nm diameter $SiO_2$ powders and 1.7 g of dispersant were mixed in 90 ml of water to form a slurry with a solid content of 8.3%. The powders in the slurry were spray dried at a pressure of 3 bars, and then thermally treated at 750° C. for 20 minutes to complete the self-cleaning powders. As can be seen from the SEM picture of FIG. 7, the resulting powder is a micron-scale spherical particle with a particulate surface structure.

Example 2

10 g of ZnO powders with an average diameter ranging from 30-100 nm and 1 g of dispersant were mixed in 89 ml of water to form a slurry with a solid content of 10%. The powders in the slurry were fabricated into self-cleaning powders by spray pyrolysis at 3 bars, 850° C.

Example 3

10 g of $Zn_2SnO_4$ powders with an average diameter ranging from 30-100 nm were mixed in 90 ml of water to form a slurry with a solid content of 10%. The powders in the slurry were fabricated into self-cleaning powders by spray pyrolysis at 3 bars, 850° C.

Example 4

Figure 8:
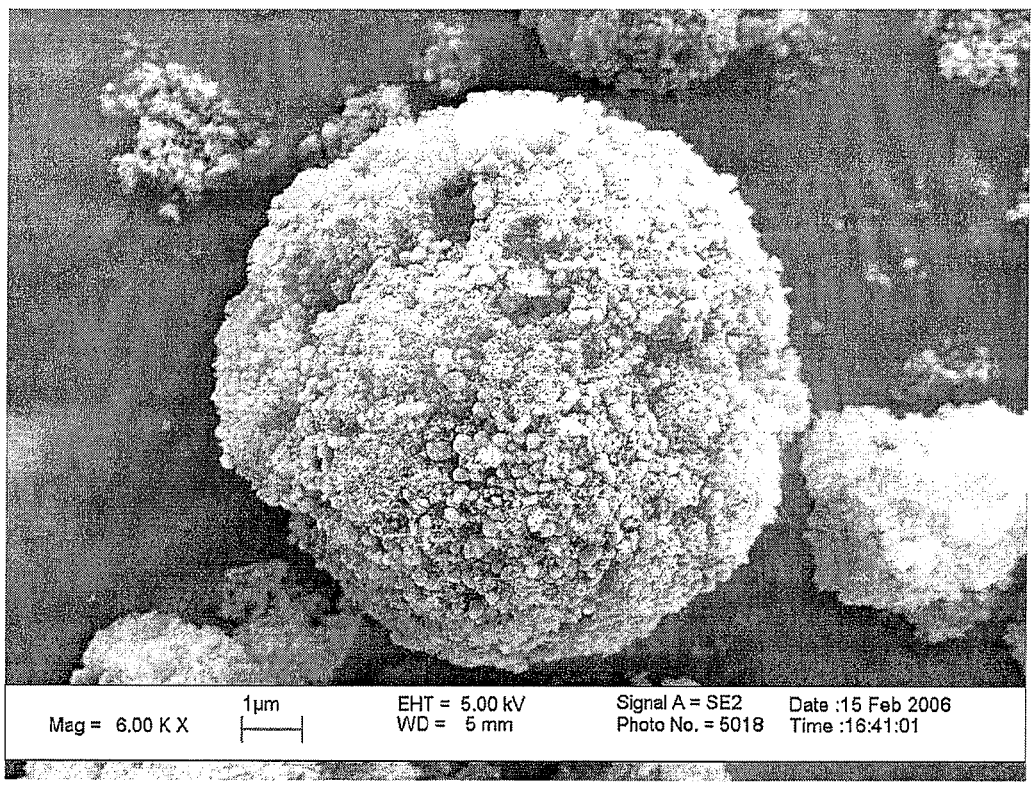
FIG. 8 is a SEM picture of the superhydrophobic and self-cleaning powder formed from $TiO_2$—$SiO_2$ core-shell powders and $SiO_2$ powders.
Figure 9:
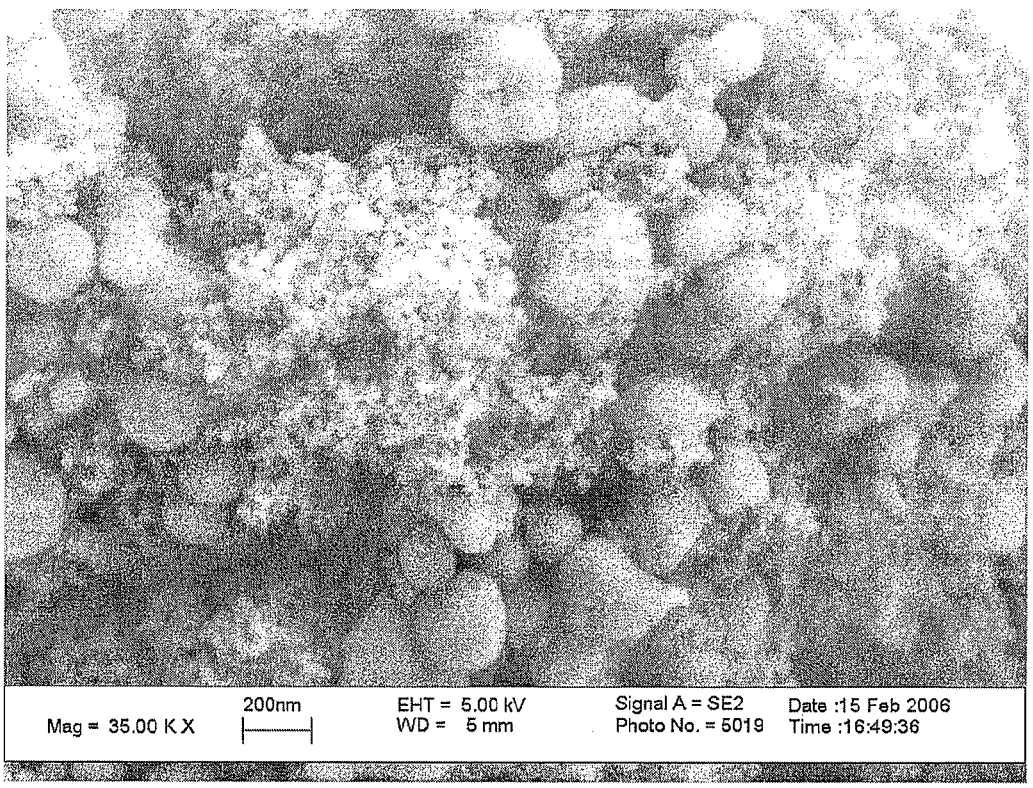
FIG. 9 is an enlarged view of the superhydrophobic and self-cleaning powder shown in FIG. 8.

10 g of 10 nm diameter $SiO_2$ powders, 10 g of 250 nm diameter $TiO_2$ powders coated with silicon oxide barrier and 3 g of dispersant were mixed in 67 ml of water to form a slurry with a solid content of 10%. The powders in the slurry were spray dried at a pressure of 3 bars, and then thermally treated at 750° C. for 20 minutes to complete the self-cleaning powders. As can be seen from the SEM picture of FIG. 8, the resulting powder is a micron-scale spherical particle with a particulate surface structure, which is more clearly shown in the enlarged view of FIG. 9.

Example 5

Figure 5:
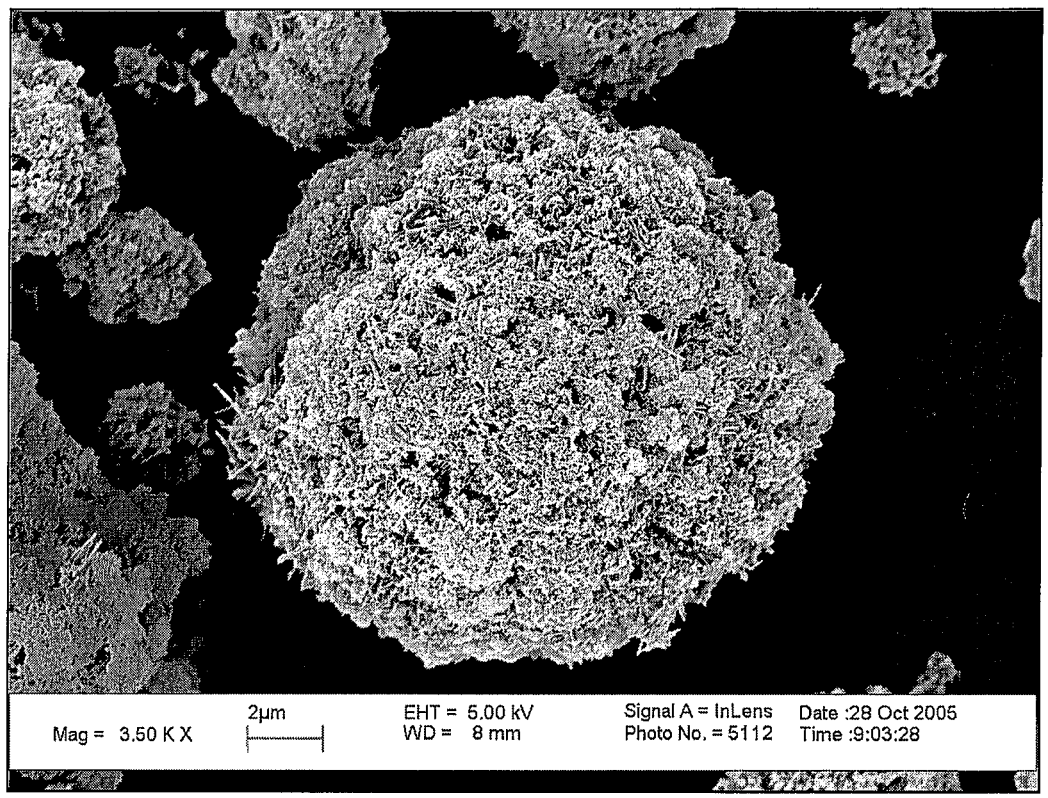
FIG. 5 is a SEM picture of the superhydrophobic and self-cleaning powder formed from $SiO_2$-coated, tetrapod-shaped ZnO powders and $SiO_2$ powders.
Figure 6:
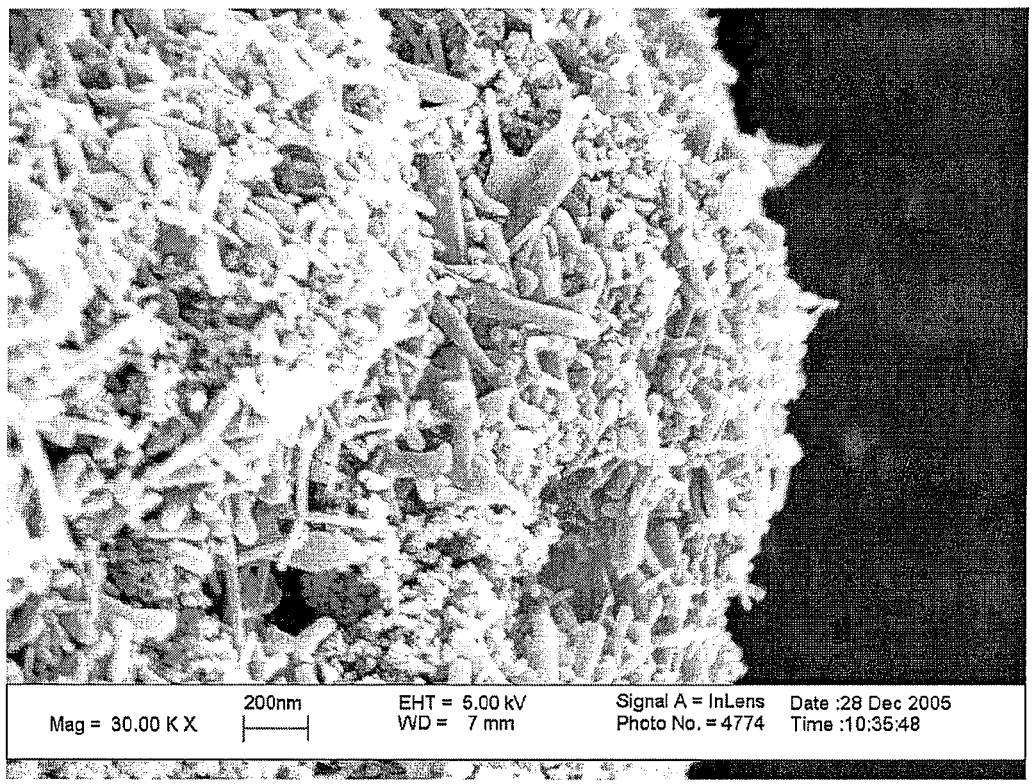
FIG. 6 is an enlarged view of the superhydrophobic and self-cleaning powder shown in FIG. 5.

10 g of 10 nm diameter $SiO_2$ powders, 10 g of 30 nm diameter tetrapod-shaped ZnO powders coated with silicon oxide barrier, and 2 g of dispersant were mixed in 78 ml of water to form a slurry with a solid content of 20%. The powders in the slurry were fabricated into self-cleaning powders by spray pyrolysis at 3 bars, 850° C. As can be seen from the SEM picture of FIG. 5, the resulting powder is a micron-scale spherical particle with a needle-like surface structure, which is more clearly shown in the enlarged view of FIG. 6.

Example 6

Figure 3:
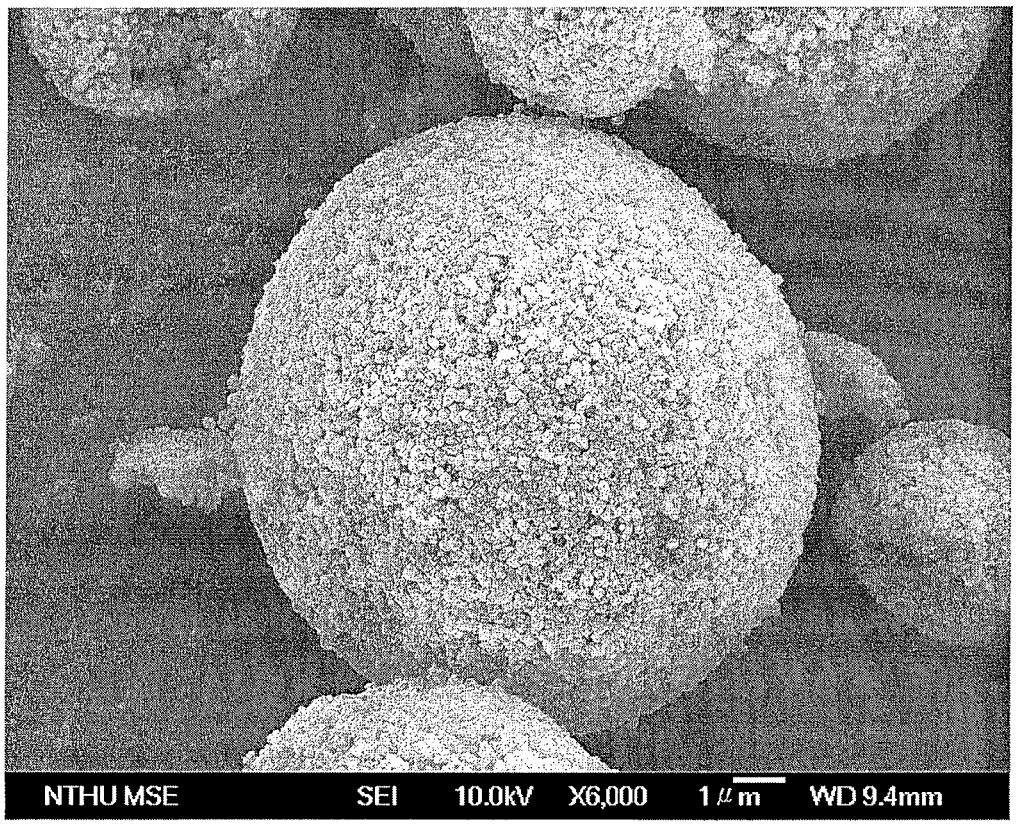
FIG. 3 is a SEM (scanning electron microscope) picture of the superhydrophobic and self-cleaning powder formed from $TiO_2$—$SiO_2$ core-shell powders and $Al_2O_3$ powders.
Figure 4:
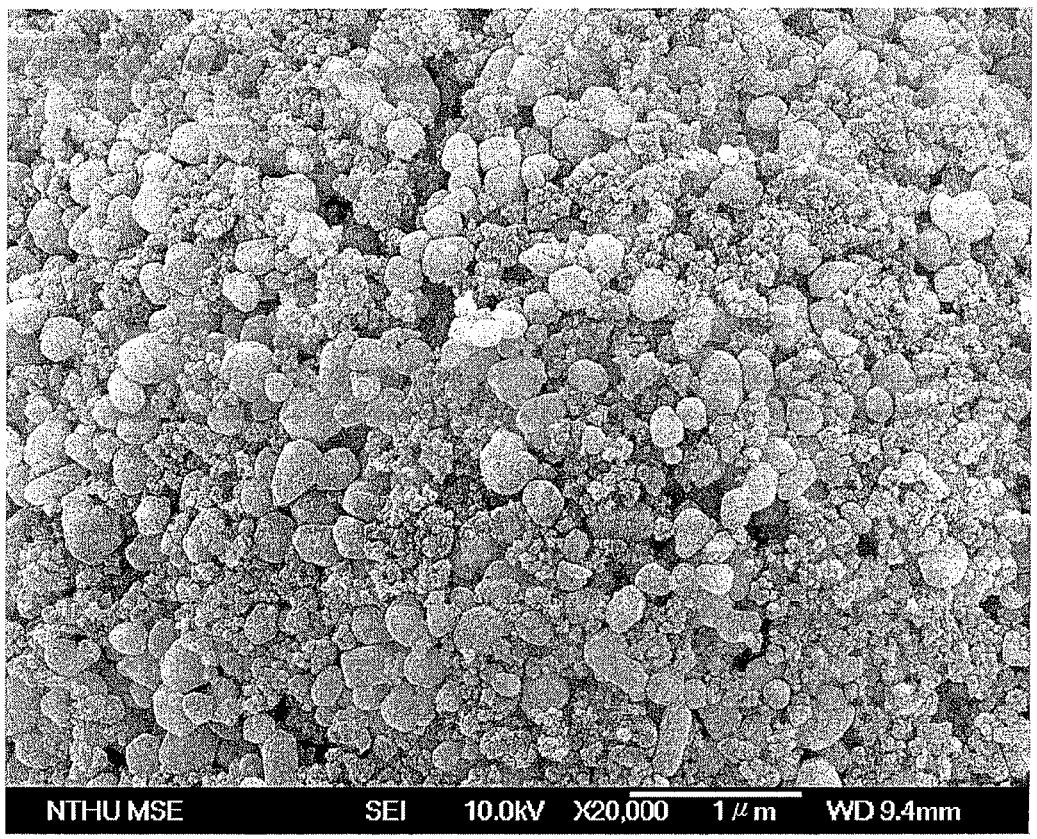
FIG. 4 is an enlarged view of the superhydrophobic and self-cleaning powder shown in FIG. 3.

20 g of 50 nm diameter $Al_2O_3$ powders and 20 g of 250 nm diameter $TiO_2$ powders coated with silicon oxide barrier were mixed in 60 ml of water to form a slurry with a solid content of 40%. The powders in the slurry were spray dried at a pressure of 3 bars, and then thermally treated at 750° C. for 20 minutes to complete the self-cleaning powders. As can be seen from the SEM picture of FIG. 3, the resulting powder is a micron-scale spherical particle with a particulate surface structure, which is more clearly shown in the enlarged view of FIG. 4.

Example 7

The self-cleaning powders of Examples 1, 4, and 6, respectively were added to a silicone aqueous paint and car wax with a weight ratio of 5%, which were then coated onto wood or metal. The coatings exhibited a water contact angle of above 132° and 112°, respectively.

Example 8

The self-cleaning powders of Examples 1, 4, and 6, respectively were added into low density polyethylene (LDPE) with a weight ratio of 5%. The resulting material exhibited a water contact angle of above 116°.

Example 9

The self-cleaning powders of Examples 1, and 3-5 were directly applied over a bare wood plate and transparent polycarbonate, respectively. The water contact angles of the resulting hydrophobic surfaces are listed in the following Table.

|  | Bare wood plate | Polycarbonate |
| --- | --- | --- |
| Example 1: $SiO_2$ | 141° | 146° |
| Example 3: $Zn_2SnO_4$ | 130° | 133° |
| Example 4: $TiO_2 + SiO_2$ | 139° | 142° |
| Example 5: $ZnO + SiO_2$ | 134° | 140° |
| Example 6: $TiO_2 + Al_2O_3$ | 138° | 142° |

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. Superhydrophobic and self-cleaning powders, comprising:
   binary-structured spherical powders comprising particles with a micron-scale diameter and a nano-scale surface roughness;
   wherein the particles of the binary-structured spherical powders have an average diameter of 5-25 μm, and a surface roughness Ra of about 3-100 nm;
   wherein the binary-structured spherical powders are modified with a hydrophobic agent; and
   wherein the binary-structured spherical powders are fabricated by granulation and calcination of nanoparticles and/or sub-micron particles as starting powders, which comprise $SiO_2$, $TiO_2$, ZnO, $Al_2O_3$, $Zn_2SnO_4$, or combinations thereof.

2. The superhydrophobic and self-cleaning powder as claimed in claim 1, wherein the starting powders are (i) nanoparticles formed of a same material; (ii) nanoparticles and sub-micron particles formed of a same material; (iii) nanoparticles formed of different materials; or (iv) nanoparticles and sub-micron particles formed of different materials.

3. The superhydrophobic and self-cleaning powder as claimed in claim 1, wherein the starting powders comprise a spherical shape, a tetrapod shape, or a combination thereof.

4. The superhydrophobic and self-cleaning powder as claimed in claim 1, wherein the starting powders are coated with a transparent barrier layer, thereby forming a core-shell structure.

5. The superhydrophobic self-cleaning powder as claimed in claim 1, wherein the binary-structured spherical powders have an average diameter of about 5-20 μm, and a surface roughness Ra of about 5-50 nm.

6. The superhydrophobic and self-cleaning powder as claimed in claim 1, wherein the binary-structured spherical powders have a particulate surface structure.

7. The superhydrophobic and self-cleaning powder as claimed in claim 1, wherein the binary-structured spherical powders have a needle-like surface structure.

8. The superhydrophobic and self-cleaning powder as claimed in claim 1, which exhibits a water contact angle of above 120° when directly coated on an object.

9. The superhydrophobic and self-cleaning powder as claimed in claim 1, which exhibits a water contact angle of above 120° when added into a film formed of a paint, car wax, or plastic.

10. The superhydrophobic and self-cleaning powder as claimed in claim 1, wherein the hydrophobic agent is a Si-based hydrophobic agent comprising siloxane, silane, or silicone.

11. The superhydrophobic and self-cleaning powder as claimed in claim 1, wherein the hydrophobic agent is a F-based hydrophobic agent comprising fluorosilanes, fluoroalkyl silanes (FAS), polytetrafluoroethylene (PTFE), polytrifluoroethylene, polyvinylfluoride, or functional fluoroalkyl compounds.

12. The superhydrophobic and self-cleaning powder as claimed in claim 1, wherein the hydrophobic agent is a hydrocarbon hydrophobic agent comprising reactive wax, polyethylene, or polypropylene.

13. A method for fabricating the superhydrophobic and self-cleaning powders as set forth in claim 1, comprising:
   providing one or more of nanoparticles and/or sub-micron particles as starting powders, which comprise $SiO_2$, $TiO_2$, ZnO, $Al_2O_3$, $Zn_2SnO_4$ or combinations thereof;
   mixing the starting powders and a solvent to form a slurry; and
   granulating and calcining the starting powders in the slurry at about 100-2500° C. to form binary-structured spherical powders comprising particles with a micron-scale diameter and a nano-scale surface roughness, wherein the particles of the binary-structured spherical powders have an average diameter of 15-25 μm, and a surface roughness Ra of about 3-100 nm.

14. The method as claimed in claim 13, wherein the slurry has a solid content of about 5-40% by weight.

15. The method as claimed in claim 13, wherein the granulating and calcining are performed by spray drying followed by calcination, spray pyrolysis, flame pyrolysis, or plasma spray.

16. The method as claimed in claim 15, wherein the spray drying, spray pyrolysis, flame pyrolysis, or plasma spray is performed at a pressure of about 1-5 bars.

17. The method as claimed in claim 13, wherein the starting powders are (i) nanoparticles formed of the same material; (ii) nanoparticles and sub-micron particles formed of the same material; (iii) nanoparticles formed of different materials; and (iv) nanoparticles and sub-micron particles formed of different materials.

18. The method as claimed in claim 13, wherein the starting powders comprise a spherical shape, a tetrapod shape, or a combination thereof.

19. The method as claimed in claim 13, further comprising adding a hydrophobic agent in the slurry of the starting powders.

20. The method as claimed in claim 13, wherein the starting powders are coated with a transparent barrier layer, thereby forming a core-shell structure.

21. The method as claimed in claim 13, wherein the binary-structured spherical powders have an average diameter of about 5-20 μm, and a surface roughness Ra of about 5-50 nm.

22. The method as claimed in claim 13, wherein the binary-structured spherical powders have a particulate surface structure.

23. The method as claimed in claim 13, wherein the binary-structured spherical powders have a needle-like surface structure.

24. The method as claimed in claim 13, further comprising directly coating the binary-structured spherical powders on an object to provide a hydrophobic surface exhibiting a water contact angle of above 120°.

25. The method as claimed in claim 13, further comprising adding the binary-structured spherical powders to a film formed of a paint, car wax, or plastic to exhibit a water contact angle of above 120°.

26. A self-cleaning coating, comprising:
   a paint, car wax, or plastic; and
   the superhydrophobic and self-cleaning powders as set forth in claim 1,
   wherein the self-cleaning coating exhibits a water contact angle of above 120°.

27. The self-cleaning coating as claimed in claim 26, which exhibits a water contact angle of above 150°.

28. The self-cleaning coating as claimed in claim 26, further comprising binders, flame retardants, plasticizer, surfactants, or fillers.

* * * * *